United States Patent [19]
Gephardt et al.

[11] Patent Number: 5,404,457
[45] Date of Patent: Apr. 4, 1995

[54] APPARATUS FOR MANAGING SYSTEM INTERRUPT OPERATIONS IN A COMPUTING SYSTEM

[75] Inventors: Douglas D. Gephardt; Andrew McBride, both of Austin, Tex.

[73] Assignee: Advanced Micro Devices, Inc., Sunnyvale, Calif.

[21] Appl. No.: 837,233

[22] Filed: Feb. 14, 1992

[51] Int. Cl.⁶ .............................................. G06F 9/46
[52] U.S. Cl. .................... 395/325; 364/941; 364/941.1; 364/937; 364/DIG. 2
[58] Field of Search ............. 395/325, 725, 275; 340/825.5; 370/85.1

[56] References Cited

U.S. PATENT DOCUMENTS

| | | | |
|---|---|---|---|
| 4,177,515 | 12/1979 | Jenkins et al. | 364/200 |
| 4,326,249 | 4/1982 | Godsey | 364/200 |
| 4,509,121 | 4/1985 | Rey et al. | 364/200 |
| 4,533,994 | 8/1985 | Harrill et al. | 364/200 |
| 4,626,987 | 12/1986 | Renninger | 364/200 |
| 4,654,820 | 3/1987 | Brahm et al. | 364/900 |
| 4,760,516 | 7/1988 | Zwick | 364/200 |
| 5,032,982 | 7/1991 | Dalrymple et al. | 364/200 |
| 5,125,093 | 6/1992 | McFarland | 395/725 |
| 5,146,597 | 9/1992 | Williams | 395/725 |
| 5,155,853 | 10/1992 | Mitsuhira et al. | 395/725 |

*Primary Examiner*—Gopal C. Ray
*Attorney, Agent, or Firm*—Foley & Lardner

[57] ABSTRACT

An apparatus for managing system interrupt operations in a computing system including a processing unit and peripheral devices. The apparatus comprises a transmission circuit for transmitting signals which effects operative connection among the peripheral devices and the processing unit; an interrupt drive circuit for generating interrupt signals associated with each peripheral device drives the transmission circuit from a first signal level to a second signal level to effect generating an interrupt signal; and an acknowledge drive circuit for generating an acknowledge signal by the processing unit. Each acknowledge drive circuit drives the transmission circuit from an initial signal level to an indicating signal level to effect generation of an acknowledge signal, and drives the transmission circuit from the indicating signal level to the initial signal level upon termination of the acknowledge signal. In its preferred embodiment, the apparatus provides that no peripheral device can generate an interrupt signal for a predetermined time interval following termination of an acknowledge signal.

22 Claims, 2 Drawing Sheets

FIG. I

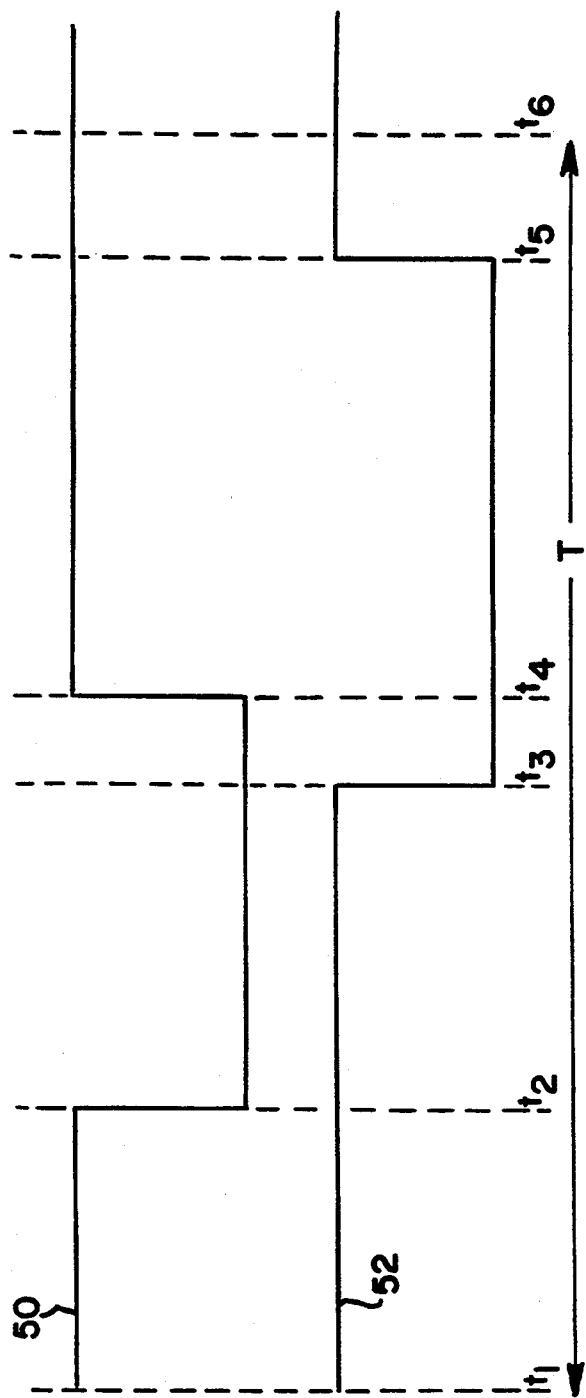
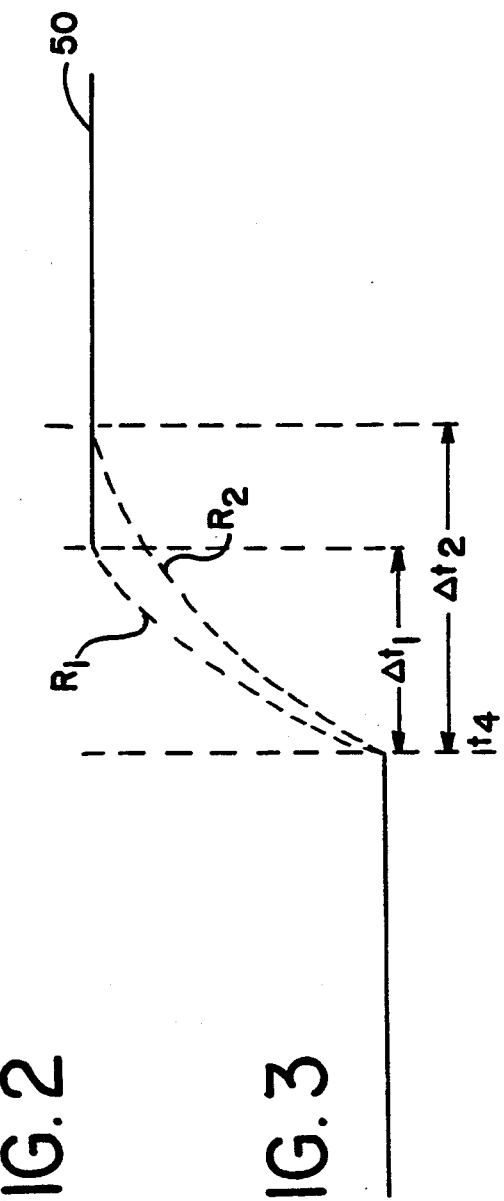
FIG. 2
FIG. 3

APPARATUS FOR MANAGING SYSTEM INTERRUPT OPERATIONS IN A COMPUTING SYSTEM

BACKGROUND OF THE INVENTION

The present invention is directed to an apparatus for managing system interrupt operations in a computing system including a processing unit and a plurality of peripheral devices. Interrupt signals are generated by peripheral devices in a computing system to notify a processing unit that access to the processing unit is required in order to effect an operation such as a memory read, a memory write, a mathematical calculation, or the like.

Some computing systems employ a simple input to the processing unit (an "interrupt line") to notify the processing unit that a given peripheral device desires access to the processing unit. Other systems employ what is known as a "system management interrupt" (SMI) which provides a line generally connected as a wired-OR line among the various peripheral devices and the processing unit. The wired-OR line is, in effect, an input-output (IO) transmission line with respect to the processing unit in that it provides the interrupt signals generated by the various peripheral devices as an input to the processing unit. The processing unit introduces an acknowledge signal as an output on the transmission line to notify the various peripheral devices affected that the processing unit is in an interrupt mode and, by another means, signals the peripheral units to terminate their transmission of interrupt signals on the transmission line. Thus, the transmission line of an SMI system may also be characterized as an interrupt/modal line.

The SMI transmission line is also an IO line with respect to peripheral devices with which it is connected. That is, an interrupt signal generated by a peripheral device constitutes an output from the peripheral device, and the acknowledge signal introduced to the transmission line by the processing unit is an input to the peripheral device.

As a wired-OR line, an SMI system requires a pull-up resistor to hold the transmission line HIGH (INACTIVE) when it is not driven. The resistance of the pull-up resistor dissipates power when a driver (either in a peripheral device or in the processing unit) is driving the transmission line. Negligible power dissipation occurs during periods when the transmission line is not driven. The choice for resistance value of a pull-up resistor involves a design trade-off because a high resistance will effect less power dissipation than will a low resistance during periods when the transmission line is driven. However, such a higher resistor value participates with the inherent capacity of the computing system and its various interconnections to generate an RC time constant which determines the rate of decay of the signals carried on the transmission line when the line transitions from a driven state to a non-driven state. Thus, a high value of a pull-up resistor will result in a longer decay interval during which the driven transmission line decays to its non-driven state. One can shorten the decay interval by reducing the value of the pull-up resistor; however, this results in greater power dissipation during times when the transmission line is driven.

Therefore, with existing apparatuses, in applications where power is desirably conserved (e.g., battery-operated computers) but where speed of operation is also a desirable factor, a designer must carefully choose the value of the pull-up resistor on the transmission line for a system management interrupt apparatus and must, necessarily, accept some trade-offs between system response time and power dissipation.

SUMMARY OF THE INVENTION

The present invention is an apparatus for managing system interrupt operations in a computing system which is responsive to a predetermined set of program instructions and includes a processing unit and a plurality of peripheral devices which facilitates low power dissipation and fast response. The apparatus comprises a transmission circuit for transmitting signals which effects operative connection among the plurality of peripheral devices and the processing unit; and a plurality of interrupt drive circuits for generating interrupt signals, one such interrupt drive circuit is associated with each respective peripheral device. Each such interrupt drive circuit, in response to its respective peripheral device, drives the transmission circuit from a first signal level to a second signal level to effect generating an interrupt signal; and at least one acknowledge drive circuit is provided for generating an acknowledge signal by the processing unit. Each acknowledge drive circuit drives the transmission circuit from an initial signal level to an indicating signal level to effect generation of an acknowledge signal, and drives the transmission circuit from the indicating signal level to the initial signal level upon termination of the acknowledge signal.

In its preferred embodiment, the apparatus provides that none of the peripheral devices can generate an interrupt signal for a predetermined time interval following termination of an acknowledge signal.

It is, therefore, an advantage of the present invention to provide an apparatus for managing system interrupt operations in a computing system which definitively drives an acknowledge signal from its ACTIVE level to its INACTIVE level upon cessation of the acknowledge signal.

It is a further advantage of the present invention to provide an apparatus for managing system interrupt operations in a computing system which is efficient in its power dissipation characteristics and enjoys fast response in its operation.

Further advantages and features of the present invention will be apparent from the following specification and claims when considered in connection with the accompanying drawings illustrating the preferred embodiment of the invention.

BRIEF DESCRIPTION OF THE DRAWINGS

FIG. 2 is a timing diagram illustrating interrupt signals and acknowledge signals within the apparatus of the present invention.

FIG. 3 is a detailed timing diagram of a specific portion of the timing diagram of the interrupt signal illustrated in FIG. 2.

DETAILED DESCRIPTION OF THE INVENTION

Figure 1:
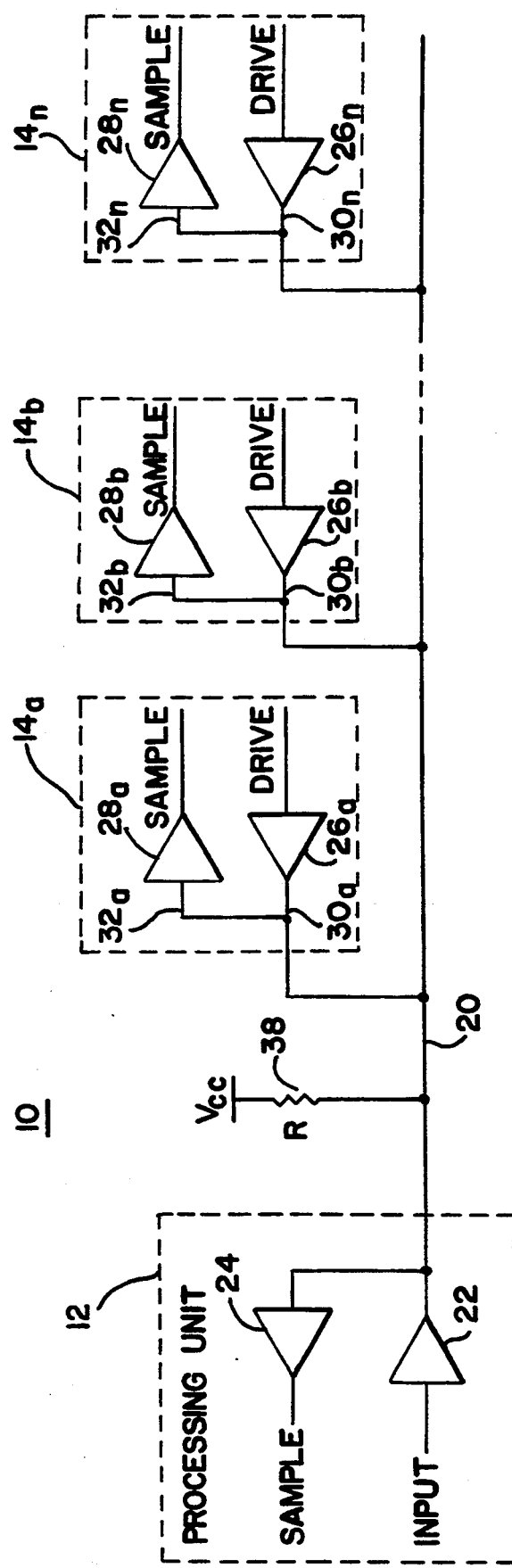
FIG. 1 is an electrical schematic diagram of the preferred embodiment of the present invention employed in a computing system.

FIG. 1 is an electrical schematic diagram of the preferred embodiment of the present invention employed in a computing system.

In FIG. 1, a computing system 10 is illustrated comprising a processing unit 12, and a plurality of peripheral devices $14_a$, $14_b$, ... $14_n$. Each of the peripheral devices 14 includes an output driver 26 and a sample buffer 28 connected in a manner whereby the output 30 of output driver 26 is operatively connected with a transmission line 20 and input 32 of sample buffer 28 is also operatively connected with transmission line 20. Transmission line 20 operatively connects processing unit 12 with peripheral devices $14_a$, $14_b$, ... $14_n$.

Thus, peripheral device $14_a$ introduces interrupt signals to transmission line 20 via output $30_a$ of output driver $26_a$, and receives signals from transmission line 20 via input $32_a$ to sample buffer $28_a$. Similarly, peripheral device $14_b$ introduces interrupt signals via output $30_b$ of its output driver $26_b$ to transmission line 20, and receives signals from transmission line 20 via input $32_b$ to sample buffer $28_b$; and peripheral device $14_n$ introduces interrupt signals via output $30_n$ of its output driver $26_n$ to transmission line 20, and receives signals from transmission line 20 via input $32_n$ to sample buffer $28_n$.

Within processing unit 12, a driver 22 introduces acknowledge signals to transmission line 20 and a sample buffer 24 receives interrupt signals from transmission line 20. A pull-up resistor 38 connects transmission line 20 with a supply voltage $V_{cc}$ in order to ensure that transmission line 20 is held HIGH when not driven.

FIG. 2 is a timing diagram illustrating a representative relationship between an interrupt signal and a responsive acknowledge signal during a time period T. In FIG. 2, when a peripheral device 14 (FIG. 1) desires access to processing unit 12, peripheral device 14 will instruct its respective output driver 26 to generate a signal at its output 30 to drive transmission line 20 to an ACTIVE (LOW) level. Thus, in FIG. 2, interrupt signal 50 changes from a HIGH (INACTIVE) level to a LOW (ACTIVE) level at time $t_2$, and remains at that ACTIVE level until time $t_4$. At time $t_4$ processing unit 12 directs output drivers 26 to cease driving transmission line 20 to its ACTIVE level and interrupt signal 50 returns to its HIGH (INACTIVE) level.

At a time following time $t_2$, processing unit 12 instructs its driver 22 to drive transmission line 20 to an ACTIVE level to responsively indicate to all peripheral devices $14_a$, $14_b$, ... $14_n$ that processing unit 12 is in an interrupt mode. Thus, in FIG. 2, acknowledge signal 52 changes from a HIGH level to a LOW (ACTIVE) level at time $t_3$, and remains at that ACTIVE level until time $t_5$. At time $t_5$, acknowledge signal 52 returns to its HIGH (INACTIVE) level. The difference between the transition of interrupt signal 50 from its ACTIVE level to its INACTIVE level and the transition of acknowledge signal 52 from its ACTIVE level to its INACTIVE level is important.

FIG. 3 is an illustration of the transition of interrupt signal 50 from its ACTIVE level to its INACTIVE level at time $t_4$. Thus, in FIG. 3, interrupt signal 50 decays along a decay trajectory from its LOW (ACTIVE) level to its HIGH (INACTIVE) level, starting at a time $t_4$ and occurring over a time interval $\Delta t$. In FIG. 3, a first resistance value $R_1$ for pull-up resistor 38 is illustrated as establishing a decay trajectory over a time interval $\Delta t_1$; a second value $R_2$ of pull-up resistor 38 is illustrated in FIG. 3 as establishing a decay trajectory over a time interval $\Delta t_2$. Resistive value $R_1$ is lower than resistive value $R_2$. Thus, resistance value $R_2$ establishes a longer time period over which the decay trajectory of interrupt signal 50 occurs. In the interest of speed of operation of a computing system, such a decay would preferably occur over as short a time interval as possible. However, although resistance value $R_1$ (being lower than resistance value $R_2$) establishes a shorter time interval $\Delta t_1$ over which the decay trajectory of interrupt signal 50 occurs, it should be remembered that since resistance value $R_1$ is less than resistance value $R_2$, greater power dissipation occurs when transmission line 20 (see FIG. 1) is driven when resistance value $R_1$ is employed. Thus, while choosing a lower resistance value $R_1$ (as compared to resistance value $R_2$) results in a faster response time (i.e., a shorter time interval $\Delta t_1$ over which the decay trajectory of interrupt signal 50 occurs), such a lower resistance value results in greater power dissipation during times when transmission line 20 is driven.

The present invention does not rely upon an RC time constant to establish a decay trajectory of acknowledge signal 52 from its LOW (ACTIVE) level to its HIGH (INACTIVE) level. In the preferred embodiment of the present invention, driver 22 of processing unit 12 is a drive HIGH tri-state buffer which, upon termination of driving acknowledge signal 52 to its ACTIVE level (see FIG. 2) at time $t_5$, drives acknowledge signal 52 to its HIGH (INACTIVE) level to complete transmission of acknowledge signal 52. Thus, the apparatus of the present invention does not rely upon decay of acknowledge signal 52 to effect such transitions. By such manner, the apparatus of the present invention speedily and actively effects ACTIVE-to-INACTIVE transitions of acknowledge signal 52, thereby resulting in faster response time of computing system 10 (see FIG. 1) employing the apparatus of the present invention without exacerbating the power dissipation problems normally associated with speed-up of response time when transitions are dependent upon decay trajectories established by RC time constants, such as are illustrated in FIG. 3.

It is to be understood that, while the detailed drawing and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

What is claimed is:

1. An apparatus for managing system interrupt operations in a computing system, said computing system including a processing unit and a plurality of peripheral devices, the apparatus comprising:

a transmission means having a single conductor for coupling said plurality of peripheral devices and said processing unit;

a plurality of interrupt drive means for conveying an interrupt signal from one of said plurality of peripheral devices to said transmission means; each respective peripheral device of said plurality of peripheral devices having an associated interrupt drive means of said plurality of interrupt drive means; one interrupt drive means of said plurality of interrupt drive means driving said transmission means from a first signal level to a second signal level to convey said interrupt signal, each said associated interrupt drive means operating in response to its respective peripheral device; and at least one acknowledge drive means for conveying an acknowledge signal from said processing unit to said transmission means responsive to receipt of said interrupt signal by said processing unit to acknowledge said interrupt signal; said at least one acknowledge drive means driving said transmission means from an initial signal level to an indicating signal level to convey said acknowledge signal; said at least one acknowledge drive means being controlled by said processing unit;

said at least one acknowledge drive means driving said transmission means from said indicating signal level to said initial signal level upon termination of said acknowledge signal, said transmission means single conductor conveying said interrupt signal and said acknowledge signal.

2. An apparatus for managing system interrupt operations in a computing system as recited in claim 1 wherein said plurality of interrupt drive means are operationally constrained from conveying an interrupt signal for a predetermined time following said termination of said acknowledge signal.

3. An apparatus for managing system interrupt operations in a computing system as recited in claim 2 wherein said acknowledge drive means comprises a drive high tri-state buffer.

4. An apparatus for managing system interrupt operations in a computing system as recited in claim 2 further comprising pull-up means for holding said conductor at said first signal level when said transmission means is not driven.

5. An apparatus for managing system interrupt operations in a computing system as recited in claim 4 wherein said pull-up means comprises a resistor.

6. An apparatus for managing system interrupt operations in a computing system as recited in claim 1 wherein said acknowledge drive means comprises a drive high tri-state buffer.

7. An apparatus for managing system interrupt operations in a computing system, said computing system including a processing unit and a plurality of peripheral devices, said processing unit and said plurality of peripheral devices being controlled by a program means for controlling said computing system, said program means comprising a predetermined set of instructions, the apparatus comprising:

a transmission means having a single conductor for coupling said plurality of peripheral devices and said processing unit;

a plurality of interrupt drive means for conveying an interrupt signal generated by one peripheral device of said plurality of peripheral devices to said transmission means; each respective peripheral device of said plurality of peripheral devices having an associated interrupt drive means of said plurality of interrupt drive means; one interrupt drive means of said plurality of interrupt drive means driving said transmission means from a first signal level to a second signal level to convey said interrupt signal, each said associated interrupt drive means being operatively responsive to its respective peripheral device; and at least one acknowledge drive means for conveying an acknowledge signal generated by said processing unit to said transmission means to acknowledge said interrupt signal; said at least one acknowledge drive means driving said transmission means from said an initial signal level to an indicating signal level to convey said acknowledge signal; said at least one acknowledge drive means being operatively responsive to said processing unit;

said at least one acknowledge drive means driving said transmission means from said indicating signal level to said initial signal level upon termination of said acknowledge signal, said transmission means single conductor conveying said interrupt signal and said acknowledge signal.

8. An apparatus for managing system interrupt operations in a computing system as recited in claim 7 wherein said program means operationally constrains said plurality of interrupt drive means from conveying an interrupt signal for a predetermined time following said termination of said acknowledge signal.

9. An apparatus for managing system interrupt operations in a computing system as recited in claim 8 wherein said acknowledge drive means comprises a drive high tri-state buffer.

10. An apparatus for managing system interrupt operations in a computing system as recited in claim 8 further comprising pull-up means for holding said conductor at said first signal level when said transmission means is not driven.

11. An apparatus for managing system interrupt operations in a computing system as recited in claim 10 wherein said pull-up means comprises a resistor.

12. An apparatus for managing system interrupt operations in a computing system as recited in claim 7 wherein said acknowledge drive means comprises a drive high tri-state buffer.

13. An apparatus for managing system interrupt operations in a computing system, said computing system including a processing unit and a plurality of peripheral devices, the apparatus comprising:

a transmission means for transmitting signals, said transmission means coupling said plurality of peripheral devices and said processing unit;

a plurality of interrupt drive means for conveying an interrupt signal generated by one of said plurality of peripheral devices to said transmission means; each respective peripheral device of said plurality of peripheral devices having an associated interrupt drive means of said plurality of interrupt drive means; one interrupt drive means of said plurality of interrupt drive means driving said transmission means from a first signal level to a second signal level to convey said interrupt signal, each said associated interrupt drive means operating in response to its respective peripheral device; and an acknowledge drive means for conveying an acknowledge signal generated by said processing unit to said transmission means responsive to said interrupt signal to acknowledge said interrupt signal; said acknowledge drive means driving said transmission means from an initial signal level to an indicating signal level to convey said acknowledge signal; said acknowledge drive means being controlled by said processing unit;

said acknowledge drive means driving said transmission means from said indicating signal level to said initial signal level upon termination of said acknowledge signal, said transmission means having a single electrical conductor for conveying said interrupt signal and said acknowledge signal.

14. An apparatus for managing system interrupt operations in a computing system as recited in claim 13 wherein said plurality of interrupt drive means are operationally constrained from conveying an interrupt signal for a predetermined time following said termination of said acknowledge signal.

15. An apparatus for managing system interrupt operations in a computing system as recited in claim 14 wherein said acknowledge drive means comprises a drive high tri-state buffer.

16. An apparatus for managing system interrupt operations in a computing system as recited in claim 14 further comprising pull-up means for holding said conductor at said first signal level when said transmission means is not driven.

17. An apparatus for managing system interrupt operations in a computing system as recited in claim 16 wherein said pull-up means comprises a resistor.

18. An apparatus for managing system interrupt operations in a computing system as recited in claim 13 wherein said acknowledge drive means comprises a drive high tri-state buffer.

19. An apparatus for managing system interrupt operations in a computing system, said computing system including a processing unit and a plurality of peripheral devices, the apparatus comprising:
a transmission means for coupling said plurality of peripheral devices and said processing unit;
a plurality of interrupt drive means for conveying an interrupt signal from one of said plurality of peripheral devices to said transmission means; each respective peripheral device of said plurality of peripheral devices having an associated interrupt drive means of said plurality of interrupt drive means; one interrupt drive means of said plurality of interrupt drive means driving said transmission means from a first signal level to a second signal level to convey said interrupt signal, each said associated interrupt drive means operating in response to its respective peripheral device; and
at least one acknowledge drive means for conveying an acknowledge signal from said processing unit to said transmission means responsive to receipt of said interrupt signal by said processing unit to acknowledge said interrupt signal; said at least one acknowledge drive means driving said transmission means from an initial signal level to an indicating signal level to convey said acknowledge signal; said at least one acknowledge drive means being controlled by said processing unit;
said at least one acknowledge drive means driving said transmission means from said indicating signal level to said initial signal level upon termination of said acknowledge signal, said transmission means conveying said interrupt signal and said acknowledge signal.

20. An apparatus for managing system interrupt operations as recited in claim 19 wherein said plurality of interrupt drive means are operationally constrained from conveying an interrupt signal for a predetermined time following said termination of said acknowledge signal.

21. An apparatus for managing system interrupt operations in a computing system as recited in claim 20 wherein said acknowledge drive means comprises a drive high tri-state buffer.

22. An apparatus for managing system interrupt operations in a computing system as recited in claim 19 wherein said acknowledge drive means comprises a drive high tri-state buffer.

* * * * *